United States Patent [19]

Borchardt

[11] Patent Number: 5,227,019

[45] Date of Patent: * Jul. 13, 1993

[54] WASTEPAPER DEINKING PROCESS

[75] Inventor: John K. Borchardt, Houston, Tex.

[73] Assignee: Shell Oil Company, Houston, Tex.

[*] Notice: The portion of the term of this patent subsequent to Jul. 6, 2010 has been disclaimed.

[21] Appl. No.: 738,700

[22] Filed: Jul. 31, 1991

[51] Int. Cl.$^5$ .............................................. D21C 5/02
[52] U.S. Cl. .............................................. 162/6; 162/5
[58] Field of Search .............................. 162/5, 6, 7, 8

[56] References Cited

U.S. PATENT DOCUMENTS

| | | | |
|---|---|---|---|
| 3,932,206 | 1/1976 | Illingworth et al. | 162/5 |
| 4,162,186 | 7/1979 | Wood et al. | 162/5 |
| 4,518,459 | 5/1985 | Freis et al. | 162/5 |
| 4,561,933 | 12/1985 | Wood et al. | 162/5 |
| 4,618,400 | 10/1986 | Wood et al. | 162/5 |
| 4,666,558 | 5/1987 | Wood et al. | 162/5 |

FOREIGN PATENT DOCUMENTS

| | | | |
|---|---|---|---|
| 729070 | 3/1966 | Canada . | |
| 52-20563 | 10/1968 | Japan | 162/5 |
| 53-31804 | 3/1976 | Japan . | |
| 55-51892 | 6/1978 | Japan . | |
| 1186592 | 8/1986 | Japan | 162/5 |
| 1012527 | 5/1963 | United Kingdom | 162/7 |

*Primary Examiner*—Karen M. Hastings

[57] ABSTRACT

The invention therefore relates to a process for the deinking of wastepaper stocks which comprises:
 a) converting the wastepaper to a pulp and contacting said pulp with an aqueous medium of alkaline pH containing a surface active deinking agent, and
 b) subjecting the resulting pulp-containing medium to one or more flotation steps wherein said final flotation step is carried out at a pH of less than about 7 to remove suspended ink therefrom and to condition said pulp-containing medium for subsequent addition to a paper machine.

18 Claims, No Drawings

WASTEPAPER DEINKING PROCESS

FIELD OF THE INVENTION

This invention relates to a process for the removal of ink from printed wastepaper in the course of reclaiming the fiber content of the wastepaper for reuse in the manufacture of new paper. More particularly, the present invention relates to a wastepaper deinking process having at least one flotation step which is carried out at a mildly acidic pH.

BACKGROUND OF THE INVENTION

Wastepaper has long served as a source of the raw fiber materials used in papermaking. Traditionally, fiber from wastepaper was utilized only in the production of low grade paper and paperboard products. Today, however, greater utilization of reclaimed fiber has provided incentive for taking steps to upgrade the reclaimed product. These steps include treatment to effectively remove ink from waste fibers in order to permit their use in the manufacture of newsprint and high quality papers. Because of its quantity, waste newsprint is a particularly important feedstock to such reclamation processes.

In the course of the conventional paper reclamation process of interest, deinking procedures include steps for converting the wastepaper to pulp and contacting the pulp with an alkaline aqueous deinking medium containing a chemical deinking agent. The physical pulping and the alkalinity of the aqueous medium cause the partial removal of ink from the pulp fiber and the deinking agent completes this removal and produces a suspension and/or dispersion of the ink particles thus removed from the pulp. The resulting mixture is subsequently treated by flotation or washing to separate the suspended ink from the pulp.

In most conventional deinking processes, the flotation is carried out at alkaline pH, usually 8.5–10.5. Conducting the flotation at alkaline pH is convenient because the fluid carried over from the pulping step is alkaline. In addition, many flotation deinking processes use fatty acids as surfactants and these fatty acids are capable of functioning as surfactants only when the aqueous medium is sufficiently alkaline to ionize them.

It is known in the art that the removal of ink from wastepaper can be accomplished by a deinking process in which the paper is reduced to pulp and the pulp is contacted with an aqueous medium containing a surfactant as a deinking agent. It is also known in the paper deinking art (for example, U.S. Pat. No. 4,162,186) to employ chemical agents which are ethylene oxide adducts ("ethoxylates") of detergent-range alcohols or alkyl-substituted phenols containing an average of about 7 to about 15 oxyethylene units per molecule of alcohol. It is further known from U.S. Pat. No. 4,518,459 to use surfactants for deinking which are hydroxy-terminated or benzyl ether-terminated ethylene oxide-propylene oxide adducts (ethoxypropoxylates) of high molecular weight or long chain alcohols. These deinking processes, however, were carried out under conventional alkaline or basic conditions.

OBJECTS OF THE INVENTION

It is an object of this invention to apply certain deinking agents, alcohol ethoxylates and/or alcohol propoxyethoxylates in a process for the deinking of printed wastepaper having one or more flotation steps, with the final flotation step being carried out at mildly acidic conditions. It is a further object of this invention to have a process which offers a high level of performance from the standpoint of the overall brightness of papers prepared from the deinked pulp as a result of utilizing surface active deinking agents and active mildly acidic conditions in the final flotation step.

SUMMARY OF THE INVENTION

The invention therefore relates to a process for the deinking of wastepaper stocks which comprises:

a) converting the wastepaper to a pulp and contacting said pulp with an aqueous medium of alkaline pH containing a surface active deinking agent, and b) subjecting the resulting pulp-containing medium from step a)

c) washing the pulp of step b) to remove additional ink, d) bleaching the pulp of step c) at an alkaline pH using hydrogen peroxide, e) contacting the pulp of step d) with a second surface active deinking agent selected from the group consisting of alcohol ethoxylate compounds, alcohol propoxyethoxylate compounds and mixtures thereof, and f) subjecting the pulp of step e) to one or more flotation steps wherein the final flotation step is carried out at a pH of less than about 7 to remove suspended ink therefrom and to condition said product for subsequent addition to a paper machine.

DESCRIPTION OF THE PREFERRED EMBODIMENTS

The present invention centers on a deinking process which necessarily contains at least one mildly acidic flotation step prior to delivery of the pulp to the paper machine. The invention further relates to the use of surface active deinking agents which function effectively and efficiently when the flotation step of the deinking process is carried out at mildly acidic pH values. This acidic flotation step may occur shortly after hydrapulping, or alternatively, the acidic flotation step can be carried out as a second flotation step which follows an alkaline first flotation step and any washing and peroxide bleaching operations. The surface active deinking agents which are suitable for use when flotation is carried out at a mildly acidic pH are ethylene oxide adducts of detergent-range (e.g., $C_8$ to $C_{18}$) alcohols having from about 6 to about 20 oxyethylene units per molecule of alcohol and propylene oxide-ethylene oxide adducts of detergent-range alcohols having from about 0.5 to about 7 oxypropylene units and from about 1 to about 20 oxyethylene units per molecule of alcohol.

The present invention is generally applicable to the deinking of the common wastepaper stocks, such as newsprint, book, ledger, and magazine, and also to practices and procedures conventionally employed for their processing. As a rule, any such process necessarily comprises at least two principal steps: the first, a step to reduce the wastepaper feed to pulp and to contact the pulp with an aqueous medium containing the deinking agent to produce a suspension or dispersion of the ink, and, the second, a flotation treatment of the resulting pulp containing medium to remove suspended or dispersed ink particles therefrom.

The present invention centers upon carrying out the floatation step of the deinking process at a mildly acidic pH which enhances the performance of the deinking agents described herein under these mildly acidic conditions. For purposes of the invention, the surface active deinking agent in step a), i.e. first surface active deinking agent, as well as the surface active deinking agent used in step e), i.e., second surface active deinking agent is preferably one or more oxyethylene adducts (or ethoxylates) of detergent-range alcohols having from about 6 to about 20 oxyethylene units per molecule of alcohol, one or more oxypropylene-oxyethylene adducts (or propoxyethoxylates) of detergent-range alcohols, or mixtures thereof.

Suitable alcohol ethoxylate deinking agents for use in the present invention are represented by the formula

$$R-O-(CH_2-CH_2O)_n-H \qquad (I)$$

wherein R is a straight-chain or branched-chain alkyl group having in the range of from about 8 to about 18 carbon atoms, preferably from about 12 to about 18 carbon atoms, or an alkylaryl group having an alkyl moiety having from about 8 to about 12 carbon atoms and n represents the average number of oxyethylene groups per molecule and is a number in the range of from about 6 to about 20, preferably in the range of from about 7 to about 15, and more preferably in the range of from about 7 to about 13. The alkyl group can have a carbon chain which is straight or branched. Preferably, about 85 percent of the R groups in the alcohol ethoxylates utilized in the instant invention are straight-chain alkyl groups. It is understood that R can be substituted with any substituent which is inert such as, for example, halogen groups. Ethoxylates within this class are conventionally prepared by the addition of ethylene oxide to the corresponding alcohol (ROH) in the presence of a catalyst.

The alcohol ethoxylates suitable as deinking agents in the instant invention are preferably derived by ethoxylation of primary or secondary, straight-chain or branched alcohols. Suitably, the alcohols have from about 8 to about 18 carbon atoms, preferably from about 9 to about 15 carbon atoms, and more preferably from about 12 to about 15 carbon atoms. The most common ethoxylates in this class and the ones which are particularly useful in this invention are the primary alcohol ethoxylates, i.e., compounds of formula I in which R is an alkyl group and the $-O-(CH_2-CH_2O)_n-H$ ether substituent is bound to a primary carbon of the alkyl group.

Alcohols which are suitable for ethoxylation to form the alcohol ethoxylate deinking agents include coconut fatty alcohols, tallow fatty alcohols, and the commercially available synthetic long-chain fatty alcohol blends, e.g., the $C_{12}$ to $C_{15}$ alcohol blends available as NEODOL 25 Alcohol (a registered trademark of product manufactured and sold by Shell Chemical Company), the $C_{14}$ to $C_{15}$ alcohol blends available as NEODOL 45 Alcohol, the $C_{12}$ to $C_{14}$ alcohol blends available as Tergitol 24L (a registered trademark of product manufactured and sold by Union Carbide Corporation), and the $C_{12}$ to $C_{13}$ alcohol blends available, for example, as NEODOL 23 Alcohol (Shell).

Suitable alcohol ethoxylates can be prepared by adding to the alcohol or mixture of alcohols to be ethoxylated a calculated amount, e.g., from about 0.1 percent by weight to about 0.6 percent by weight, preferably from about 0.1 percent by weight to about 0.4 percent by weight, based on total alcohol, of a strong base, typically an alkali metal or alkaline earth metal hydroxide such as sodium hydroxide or potassium hydroxide, which serves as a catalyst for ethoxylation. The resulting mixture is dried, as by vapor phase removal of any water present, and an amount of ethylene oxide calculated to provide greater than about 15 moles of ethylene oxide per mole of alcohol is then introduced and the alcohol ethoxylate is allowed to react until the ethylene oxide is consumed, the course of the reaction being followed by the decrease in reaction pressure.

The ethoxylation is carried out in a conventional manner and is typically conducted at elevated temperatures and pressures. Suitable reaction temperatures range from about 120° C. to about 220° C. with the range of from about 140° C. to about 160° C. being preferred. A suitable reaction pressure is achieved by introducing to the reaction vessel the required amount of ethylene oxide which has a high vapor pressure at the desired reaction temperature. For considerations of process safety, the partial pressure of the ethylene oxide reactants is preferably limited, for instance, to less than about 60 psig, and/or the reactant is preferably diluted with an inert gas such as nitrogen, for instance, to a vapor phase concentration of about 50 percent or less. The pressure serves as a measure of the degree of the reaction and the reaction is considered to be substantially complete when the pressure no longer decreases with time.

It should be understood that the ethoxylation procedure serves to introduce a desired average number of ethylene oxide units per mole of alcohol. For example, treatment of an alcohol mixture with 7 moles of ethylene oxide per mole of alcohol serves to effect the ethoxylation of each alcohol molecule with an average of 7 ethylene oxide moieties per mole alcohol moiety, although a substantial proportion of alcohol moieties will become combined with more than 7 ethylene oxide moieties and an approximately equal proportion will have become combined with less than 7. In a typical ethoxylation product mixture, there is also a minor proportion of unreacted alcohol.

Preferred alcohol ethoxylate compounds for use as deinking agents in the present invention include ethoxylated fatty alcohols, preferably linear primary alcohols with about $C_8$ to about $C_{18}$, preferably about $C_{12}$ to about $C_{15}$ alkyl groups and an average of about 6 to about 20, preferably in the range of from about 7 to about 15, and more preferably in the range of from about 7 to about 13 moles of ethylene oxide per mole of alcohol.

A particularly preferred class of alcohol ethoxylates is represented by the condensation product of a fatty alcohol having from about 12 to about 15 carbon atoms and from about 7 to about 12 moles of ethylene oxide per mole of fatty alcohol. Suitable species of this class of ethoxylates include: the condensation product of $C_{12}$-$C_{15}$ oxo-alcohols and 9 moles of ethylene oxide; the condensation product of narrow cut $C_{14}$-$C_{15}$ oxo-alcohols and 7 or 13 moles of ethylene oxide per mole of fatty (oxo)alcohol; and the condensation of a narrow cut $C_{12}$-$C_{13}$ fatty (oxo)alcohol and 7 moles of ethylene oxide per mole of fatty alcohol. The fatty oxo-alcohols, while primarily linear, can have, depending upon the processing conditions and raw material olefins, a certain degree of branching.

Suitable alcohol propoxyethoxylate deinking agents for use in the present invention are represented by the formula

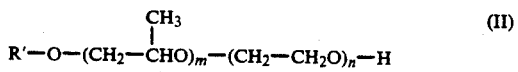

wherein R' is a straight-chain or branched-chain alkyl group having in the range of from about 8 to about 18 carbon atoms, preferably from about 12 to about 18 carbon atoms, or an alkylaryl group having an alkyl moiety having from about 8 to about 12 carbon atoms, m represents the average number of oxypropylene groups per molecule and is in the range of from about 0.5 to about 7, preferably from about 1 to about 3 and more preferably from about 1 to about 2.5, and n represents the average number of oxyethylene groups per molecule and is in the range of from about 1 to about 20, preferably from about 2 to about 12 and more preferably from about 2 to about 9. The alkyl group can have a carbon chain which is straight or branched, and the propoxylate and ethoxylate components can be a combination of straight-chain and branched molecules. Preferably, about 85 percent of the R' groups in the alcohol ethoxylates utilized in the instant invention are straight-chain. It is understood that R can be substituted with any substituent which is inert such as, for example, halo groups. Propoxyethoxylates within this class are conventionally prepared by the sequential addition of propylene oxide and ethylene oxide to the corresponding alcohol (R'OH) in the presence of a catalyst.

The alcohol propoxyethoxylates utilized in the instant invention are preferably derived by propoxylation of primary or secondary, straight-chain or branched alcohols followed by ethoxylation of the propoxylate formed. Suitably, the alcohols have from about 8 to about 18 carbon atoms, preferably from about 9 to about 15 carbon atoms, and more preferably from about 12 to about 15 carbon atoms. The most common propoxyethoxylates in this class and the ones which are particularly useful in this invention are the primary alcohol propoxyethoxylates, i.e., compounds of formula II in which R' is an alkyl group and the

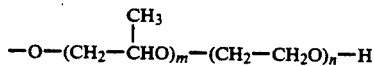

ether substituent is bound to a primary carbon of the alkyl group.

Suitable alcohol propoxyethoxylates can be prepared by adding to the alcohol or mixture of alcohols to be propoxyethoxylated a calculated amount, e.g., from about 0.1 percent by weight to about 0.6 percent by weight, preferably from about 0.1 percent by weight to about 0.4 percent by weight, based on total alcohol, of a strong base, typically an alkali metal or alkaline earth metal hydroxide such as sodium hydroxide or potassium hydroxide, which serves as a catalyst for propoxylation and ethoxylation. The resulting mixture is dried, as by vapor phase removal of any water present, and an amount of propylene oxide calculated to provide from about 1 mole to about 3 moles of propylene oxide per mole of alcohol is then introduced and the resulting mixture is allowed to react until the propylene oxide is consumed, the course of the reaction being followed by the decrease in reaction pressure. Thereafter, the resulting alcohol propoxylate is optionally dried, as by vapor phase removal of any water present, and an amount of ethylene oxide calculated to provide from about 1 mole to about 12 moles of ethylene oxide per mole of alcohol is then introduced and the alcohol propoxylate is allowed to react until the ethylene oxide is consumed, the course of the reaction being followed by the decrease in reaction pressure. For purposes of this invention, the alcohol propoxyethoxylate is necessarily prepared by the sequential addition of propylene oxide and ethylene oxide to the alcohol.

The propoxylation/ethoxylation is carried out in a conventional manner and is typically conducted at elevated temperatures and pressures. Suitable reaction temperatures range from about 120° C. to about 220° C. with the range of from about 140° C. to about 160° C. being preferred. A suitable reaction pressure is achieved by introducing to the reaction vessel the required amount of propylene oxide or ethylene oxide which has a high vapor pressure at the desired reaction temperature. A total pressure of between about 40 and 110 psig, with an ethylene oxide partial pressure between about 15 and 60 psig, is particularly preferred, while a total pressure of between about 50 and 90 psig, with an ethylene oxide partial pressure between about 20 and 50 psig, is considered more preferred. The pressure serves as a measure of the degree of the reaction and the reaction is considered to be substantially complete when the pressure no longer decreases with time.

Preferred alcohol propoxyethoxylate compounds for use as deinking agents in the present invention include propoxyethoxylated fatty alcohols, preferably linear primary alcohols with about $C_8$ to about $C_{18}$, preferably about $C_{12}$ to about $C_{15}$, alkyl groups an average of about 0.5 to about 7, preferably about 1 to about 3 moles of propylene oxide per mole of alcohol, and an average of about 1 to about 20, preferably about 2 to about 12, and more preferably about 2 to about 9 moles of ethylene oxide per mole of alcohol.

A particularly preferred class of alcohol propoxyethoxylates is represented by the condensation product of a fatty alcohol having from about 12 to about 15 carbon atoms, from about 1.5 to about 2.0 moles of propylene oxide per mole of fatty alcohol and from about 2 to about 9 moles of ethylene oxide per mole of fatty alcohol. Suitable species of this class of propoxyethoxylates include: the condensation product of $C_{12}$–$C_{15}$ oxo-alcohols, 2 moles of propylene oxide and 7 moles of ethylene oxide; the condensation product of narrow cut $C_{14}$–$C_{15}$ oxo-alcohols, 2 moles of propylene oxide, and 7 or 9 moles of ethylene oxide per mole of fatty (oxo)alcohol; and the condensation of a narrow cut $C_{12}$–$C_{13}$ fatty (oxo)alcohol, 2 moles of propylene oxide, and 6.5 moles of ethylene oxide per mole of fatty alcohol. The fatty oxo-alcohols, while primarily linear, can have, depending upon the processing conditions and raw material olefins, a certain degree of branching.

In one embodiment, the alcohol ethoxylate or alcohol propoxyethoxylate deinking agent of the instant invention additionally comprises at least one $C_8$ to $C_{18}$ fatty acid. These deinking agents are typically prepared by adding the fatty acid to the alcohol ethoxylate or alcohol propoxyethoxylate and the fatty acid can be added separately to the aqueous alkaline medium during the pulp contacting step (step a)) to form the deinking agent. Small amounts of water or glycols can be added to improve handling properties. The deinking agent thus produced will typically contain from about 85 percent by weight (% by wt.) to about 99 percent by weight alcohol ethoxylate or alcohol propoxyethoxylate and from about 15 percent by weight to about 1 percent by weight, respectively, fatty acid. In a preferred embodiment, the deinking agent will contain from about 90 percent by weight (% by wt.) to about 97 percent by weight alcohol ethoxylate or alcohol propoxyethoxylate and from about 10 percent by weight to about 3 percent by weight, respectively, fatty acid. In a particularly preferred embodiment, the deinking agent will contain from about 95 percent by weight (% by wt.) to about 97 percent by weight alcohol ethoxylate or alcohol propoxethoxylate and from about 5 percent by weight to about 3 percent by weight, respectively, fatty acid.

The fatty acids utilized in along with the alcohol ethoxylates or alcohol propoxyethoxylates to make these deinking agents are preferably about $C_8$ to about $C_{18}$, more preferably about $C_{12}$ to about $C_{18}$, as acids having less than 8 carbons result in decreased ink-coagulation capabilities and fatty acids having carbon numbers much greater than 18 result in decreased deinking capabilities. Examples of fatty acids suitable for use in the instant invention having about 8 to about 18 carbon atoms include lauric acid, stearic acid, tallow fatty acids, coconut fatty acid, hexadecanoic acid, tetradecanoic acid, with stearic acid, tallow fatty acid and coconut fatty acid being preferred. The fatty acids may be used in the form of the free acid, an alkaline metal salt, or as the alkaline earth metal salt.

The invention applies the alcohol ethoxylate or alcohol propoxyethoxylate deinking agent to wastepaper which is necessarily in the form of a pulp, that is, to wastepaper which has first been substantially reduced to the individual fibers. Pulping is suitably conducted using any of the various conventional processes and equipment designed for this purpose. Most conveniently, the wastepaper process feedstock is treated in a device known as a "hydrapulper", which produces a slurry of the fibers in water having a pH of about 9 to about 12. The resulting fibers are then contacted in an aqueous medium with the deinking agent. The contact of the fibers with the deinking agent is suitably carried out in the pulping equipment, for example, by simply adding deinking agent and caustic to the aqueous slurry of the hydropulper. Alternatively, the contact may be carried out using separate processing equipment which provides for agitation of the aqueous pulp slurry. For the contact step, the pulp is present in a quantity typically between about 0.5 percent by weight and about 12.0 percent by weight, calculated as the dry weight of the wastepaper feed relative to total weight of the slurry formed. In a preferred embodiment, the slurry contains between about 4 percent by weight and about 6 percent by weight pulp fiber. The amount of deinking agent present in the slurry is suitably between about 0.05 percent by weight and about 2.0 percent by weight, calculated basis dry fiber weight. In a preferred embodiment, the quantity of deinking agent utilized is between about 0.2 percent by weight and about 1.5 percent by weight, with between about 0.2 percent by weight and about 1.0 percent by weight being particularly preferred.

During contact between the pulp fiber and the deinking agent, the aqueous contact medium are maintained at alkaline pH. A pH value greater than about 7 is preferred, a pH between about 7 and about 13 is more preferred, and a pH between about 8 and about 10 is generally most preferred. The alkalinity is generally maintained by the addition of base such as, for example, caustic or sodium silicate, to the aqueous contact medium. Typically, the amount of base added to the contact medium is in the range of from about 1 percent by weight to about 4 percent by weight calculated basis the dry weight of the pulp fiber.

In addition to water, pulp, base and deinking agent, the contact slurry may further contain other substances conventionally employed in deinking processes such as, for example, brighteners, solvents, antifoam agents, water softeners and the like. If desired, other deinking agents may be present in addition to the specified alcohol ethoxylates or alcohol propoxyethoxylates. However, the use of additional deinking agents is neither necessary nor preferred.

Processing of the pulp slurry during contact with the deinking agent is preferably carried out at elevated temperatures, particularly temperatures in the range of from about 30° C. to about 100° C. The invention has been found to be particularly effective at a temperature in the range of from about 40° C. to about 80° C., while a temperature in the range of from about 45° C. to about 60° C. is considered especially preferred.

The contact time for the wastepaper pulp and the aqueous deinking medium is not critical for purposes of this invention. However, a contact time of greater than about 10 minutes is preferred from the standpoint of deinking performance. For purposes of process efficiency, it is preferred that the contact time be in the range of from about 20 minutes to about one hour, and more preferred that the contact time be in the range of from about 20 minutes to about 45 minutes.

Following the contact between the pulp and the aqueous medium containing the deinking agent, the contact mixture is subjected to one or more flotation steps for separation of the pulp fibers and the ink particles which are both dispersed, or suspended, in the medium.

In one embodiment, the flotation step for the separation of one or the other from the medium is carried out at slightly acidic conditions. The pH is suitably less than about 7, preferably in the range of from about 3 to about 7, more preferably in the range of from about 3.5 to about 6.5, and most preferably in the range of from about 5 to about 5.5. The slightly acidic medium is generally obtained by the addition of acid such as, for example, sulfuric acid, sulfurous acid, hydrochloric acid, to the aqueous contact medium. Typically, the amount of acid added to the contact medium is in the range of from about 0.05 percent by weight to about 2 percent by weight calculated basis the dry weight of the pulp fiber.

In another embodiment, the contact mixture is subjected to more than one flotation step. In this embodiment, the first flotation step is carried out at conventional alkaline pH and subsequently, the contact mixture is subjected to a second flotation step which is carried out at slightly acidic conditions, with the pH being suitably less than about 7, preferably in the range of from about 3 to about 7, more preferably in the range of from about 3.5 to about 6.5, and most preferably in the range of from about 5 to about 5.5. The contact mixture may suitably be subjected to washing as well as other conventional processing steps, such as for example, a reductive bleaching step in which the pulp is bleached at alkaline pH using hydrogen peroxide, between the first flotation step and the second flotation step.

The advantages associated with conducting at least one flotation step at acidic conditions include paper brightness characteristics which are equal to or improved over those in which the flotation was carried out at an alkaline pH. In addition, it is very advantageous to avoid making a pH change just prior to the pulp entering the headbox of the paper machine. Making the pulp acidic just prior to placing the pulp in the paper machine can have an adverse effect on paper properties as the cellulose fibers do not have time to equilibrate to the acidic pH before the paper is removed from the paper machine and dried. Giving the cellulose fibers time to adjust to an acidic paper machine pH is known as conditioning the fibers.

Flotation methods of ink isolation generally involve bubbling a stream of air or another gas through the pulp. The air bubbles rise to the surface and carry the ink particles with them thereby generating foam which can be separated. It will be understood that in addition to a pulping and contact step and an ink removal step as described herein, the invention may be practiced using other process steps as are employed in wastepaper reclamation operations in general and newsprint deinking in particular.

The ranges and limitations provided in the instant specification and claims are those which are believed to particularly point out and distinctly claim the present invention. It is, however, understood that other ranges and limitations which perform substantially the same function in substantially the same manner to obtain the same or substantially the same result are intended to be within the scope of the instant invention as defined by the instant specification and claims.

The invention will be described below by the following examples which are provided for purposes of illustration and are not to be construed as limiting the invention.

ILLUSTRATIVE EMBODIMENTS

Example 1

This example illustrates the deinking of waste newsprint carried out according to the process of the invention using as deinking agent a mixture of $C_{14}$ to $C_{15}$ predominantly linear and primary alcohols (about 60% wt. $C_{14}$ and 40% wt. $C_{15}$) containing an average of about 13 oxyethylene units per molecule. The ethoxylate deinking agent was prepared by an addition reaction carried out in the presence of a conventional potassium hydroxide catalyst. Ethylene oxide was added to the mixture of $C_{14}$ to $C_{15}$ alcohols to form the ethoxylate.

To test the performance of the invention, the following procedures were carried out for the deinking of waste newsprint.

Sample Preparation

Newsprint was shredded by hand and mixed well. Unprinted margins of the paper were trimmed before shredding and collected for use as blank standard.

Hydrapulping and Deinking

Tap water was heated to 40°-45° C. Sodium metasilicate pentahydrate was added to adjust the pH to about 9. To this was added 4 milliliters of 1% by weight surfactant solution (0.2% surfactant by weight relative to dry waste paper). A slurry of about 5% consistency was prepared by adding 20 grams of shredded newsprint. This slurry was mixed for 30 minutes in a Hamilton-Beach mixer on the high speed stir setting.

This slurry was then subjected to flotation.

Flotation

Tap water was heated to 40°-45° C. and about 2 liters placed in a Denver Flotation Machine. This unit consists of a stir motor, an impeller shaft and stirrer blade and a container for the pulp slurry. As the slurry is stirred, air is drawn down the hollow stirrer shaft and exits at the stirrer blades through small holes. The air bubbles created in this fashion rise through the pulp slurry taking ink particles with them. The froth at the top of the container is removed to separate the ink particles from the pulp slurry.

The pulp slurry was added to the container and diluted to a total volume of about 5 liters using additional 40°-45° C. tap water. The pH was then adjusted to 5.5 by the addition of aqueous 10% sulfuric acid. Pulp slurry consistency was about 0.5% by weight. This mixture was stirred for 10 minutes at 900 revolutions per minute while slurry foam was skimmed off and collected.

The slurry was decanted from the flotation cell and filtered through the 100 U.S. mesh screen.

Reductive Bleaching

The pulps resulting from flotation were separately diluted to 800 milliliters with 40°-45° C. tap water. To this was added 0.17 grams of sodium hydrosulfite. The slurry pH was adjusted to 4.0-4.5 with the addition of 40-45 milliliters of 0.1N hydrochloric acid solution. The resulting mixture was gently stirred and then allowed to sit for 30 minutes.

This sodium hydrosulfite reductive bleaching increases brightness.

Paper Making

Deinking process performance was measured by making paper from the deinked pulp and analyzing the paper for brightness and dirt count. Each bleached pulp was divided into four portions so that at least three, and preferably four, handsheets each weighing 3-4 grams could be made. Each portion of pulp was dispensed in 7 liters of 40°-45° C. tap water in a TMI TAPPI (Technical Association of the Pulp and Paper Industry) Standard Sheet Machine.

In the machine, pulp was deposited forming a wet sheet, through which water drained rapidly. The sheet thus formed was covered with a piece of thick wet filter paper followed by a piece of thick dry filter paper and the several layers then squeezed by rolling with a 30 lb. rolling pin. The layers were next removed from the apparatus and the prepared sheet separated from the filter papers. Finally, the prepared sheet was placed between four thick filter papers (two above and two below), pressed with a force of 50 psig, and dried between fresh thick filter papers at room temperature in the dark for about 24 hours.

The papers ("handsheets") thus prepared were analyzed for brightness, in comparison to handsheets prepared from the blank standards using the same procedures. Brightness measurements were made on the basis of percent light reflection from the sheet, using a standardized Technidyne S-4 Brightness Tester. Eight measurements were made for each sheet, one at the center of each of four quadrants on both sides, and the eight values averaged for the sheet. Normally, the eight separate measurements varied over a range of no more than about 1%. Reported brightness readings were the average of the brightness results for at least three similarly processed sheets.

The hand sheets were inspected for ink ("dirt") particles using an image analysis method. One inch by one inch square sections in each quadrant of the circular handsheet were studied. Images were directly input into a Tracor Northern 8502/C Image Analyzer using an MTI series 6800 video camera with a Minolta 50 millimeter macro lens. A blank image revealed systematic artifacts including specks and shadows which were inherent to the image acquisition system. These were subtracted from the handsheet image. A 75×75 large median filter was used to correct for long-range brightness variation in the sample image. This filter created an image of the long-range variations that was subtracted from the sample image. The ink count (relative hand sheet surface area occupied by ink particles expressed in parts per million) was determined for particles larger in area than 0.04 square millimeters. Control experiments for ten different handsheets indicted that the ink count values obtained using image analysis were similar to those obtained using TAPPI standard procedure t437 ppm-85.

The results of the brightness and ink count tests are presented in Table I.

Example 2

The procedures of Example 1 were repeated with the exception that the flotation step was carried out at a pH of 3.5.

The results of these tests are presented in Table I.

Example 3

The procedures of Example 1 were repeated with the exception that the alcohol ethoxylate deinking agent used was a mixture of $C_{14}$ to $C_{15}$ predominantly linear and primary alcohols (about 60% wt. $C_{14}$ and 40% wt. $C_{15}$) containing an average of about 7 oxyethylene units per molecule.

The results are presented in Table I.

Example 4

The procedures of Example 3 were repeated with the exception that the flotation step was carried out at a pH of 3.5.

The results of these tests are presented in Table I.

Example 5

The procedures of Example 1 were repeated with the exception that the alcohol ethoxylate deinking agent used was a mixture of $C_{12}$ to $C_{15}$ predominantly linear and primary alcohols (about 30% wt. $C_{12}$, 25% wt. $C_{13}$, 25% wt. $C_{14}$ and 20% wt. $C_{15}$) containing an average of about 9 oxyethylene units per molecule.

The results are presented in Table I.

Example 6

The procedures of Example 5 were repeated with the exception that the flotation step was carried out at a pH of 3.5.

The results of these tests are presented in Table I.

Example 7

The procedures of Example 5 were repeated with the exception that the flotation step was carried out at a pH of 7.0.

The results of these tests are presented in Table I.

Example 8

The procedures of Example 7 were repeated with the exception that the deinking agent used was $C_{12}$–$C_{15}$-$(PO)_2(EO)_7$.

The results of these tests are presented in Table I.

Example 9

The procedures of Example 1 were repeated with the exception that the deinking agent used was $C_{12}$–$C_{15}$-$(PO)_2(EO)_7$.

The results of these tests are presented in Table I.

Example 10

The procedures of Example 5 were repeated with the exception that the deinking agent used was $C_{12}$–$C_{15}$-$(PO)_2(EO)_7$.

The results of these tests are presented in Table I.

Example 11

The procedures of Example 8 were repeated with the exception that the deinking agent used was $C_{14}$–$C_{15}$-$(PO)_3(EO)_6$.

The results of these tests are presented in Table I.

Example 12

The procedures of Example 4 were repeated with the exception that the deinking agent used was $C_{14}$–$C_{15}$-$(PO)_3(EO)_6$.

The results are presented in Table I.

Example 13

The procedures of Example 7 were repeated with the exception that the deinking agent used was $C_{14}$–$C_{15}$-$(PO)_3(EO)_{17}$.

The results are presented in Table I.

Example 14

The procedures of Example 2 were repeated with the exception that the deinking agent used was $C_{14}$–$C_{15}$-$(PO)_3(EO)_{17}$.

The results are tabulated in Table I.

Example 15

The procedures of Example 7 were repeated with the exception that the deinking surfactant was a 95:5 (by weight) blend of $C_{12}$–$C_{15}(EO)_9$ and coconut fatty acid.

The results are summarized in Table I.

Comparative Example A

The procedures of Example 1 were repeated with the exception that the flotation step was carried out at a pH of 9.0.

The results are presented in Table I.

Comparative Example B

The procedures of Example 3 were repeated with the exception that the flotation step was carried out at a pH of 9.0.

The results are presented in Table I.

Comparative Example C

The procedures of Example 5 were repeated with the exception that the flotation step was carried out at a pH of 9.0.

The results are presented in Table I.

Comparative Example D

The procedures of Example 8 were repeated with the exception that the flotation step was carried out at a pH of 9.0.

The results are presented in Table I.

TABLE I

| Example Number | Surfactant | Flotation pH | Flotation Deinking Performance Brightness (%) | Ink Count (ppm) |
|---|---|---|---|---|
| 1 | $C_{14}$–$C_{15}$ $(EO)_{13}$ | 5.5 | 56 | 291 |
| 2 | $C_{14}$–$C_{15}$ $(EO)_{13}$ | 3.5 | 57 | — |
| 3 | $C_{14}$–$C_{15}$ $(EO)_{7}$ | 5.5 | 55 | 196 |
| 4 | $C_{14}$–$C_{15}$ $(EO)_{7}$ | 3.5 | 59 | 140 |
| 5 | $C_{12}$–$C_{15}$ $(EO)_{9}$ | 5.5 | 54 | 206 |
| 6 | $C_{12}$–$C_{15}$ $(EO)_{9}$ | 3.5 | 54 | 140 |
| 7 | $C_{12}$–$C_{15}$ $(EO)_{9}$ | 7.0 | 55 | 149 |
| 8 | $C_{12}$–$C_{15}(PO)_2(EO)_7$ | 7.0 | 55 | 135 |
| 9 | $C_{12}$–$C_{15}(PO)_2(EO)_7$ | 5.5 | 52 | — |
| 10 | $C_{12}$–$C_{15}(PO)_2(EO)_7$ | 3.5 | 58 | 156 |
| 11 | $C_{14}$–$C_{15}(PO)_3(EO)_6$ | 7.0 | 55 | — |
| 12 | $C_{14}$–$C_{15}(PO)_3(EO)_6$ | 3.5 | 53 | 99 |
| 13 | $C_{14}$–$C_{15}(PO)_3(EO)_{17}$ | 7.0 | 55 | 135 |
| 14 | $C_{14}$–$C_{15}(PO)_3(EO)_{17}$ | 3.5 | 58 | 187 |
| 15  95:5[a] | $C_{12}$–$C_{15}(EO)_9$:CFA | 7.0 | 58 | 132 |
| Comparative A | $C_{14}$–$C_{15}$ $(EO)_{13}$ | 9.0 | 55 | 216 |
| Comparative B | $C_{14}$–$C_{15}$ $(EO)_{7}$ | 9.0 | 55 | 317 |
| Comparative C | $C_{12}$–$C_{15}$ $(EO)_{9}$ | 9.0 | 54 | 461 |
| Comparative D | $C_{12}$–$C_{15}(PO)_2(EO)_7$ | 9.0 | 53 | 149 |

[a] Proportion by weight of alcohol ethoxylate to CFA-(coconut fatty acid).

As can be seen in Table I, excellent brightness values were obtained when the flotation deinking was performed at a pH ranging from 3.5–7. The results compare well to those obtained in flotation deinking conducted at a conventional alkaline pH of 9.0. Comparative Example A was performed at a pH of 9.0. Using the same surfactant, a mixture of $C_{14}$ to $C_{15}$ predominantly linear and primary alcohols containing an average of about 13 oxyethylene units per molecule and performing the flotation at a pH of 5.5 and 3.5 results in brightness values equal to or greater than that obtained in Comparative Example A. A brightness difference of 2 units is considered experimentally significant.

The optics of the image analysis system are sensitive to the contrast between ink specks and background handsheet. Faint ink specks are more difficult to detect. Increasing the contrast, i.e., the handsheet brightness makes these faint ink specks easier to detect. Therefore, ink count values should be compared only for handsheets having the same brightness. The apparent greater ink surface area of Example 1 compared to Comparative Example A is not experimentally significant.

The flotation deinking in Comparative Example B was performed at the conventional alkaline pH of 9.0 using a mixture of $C_{14}$ to $C_{15}$ predominantly linear and primary alcohols containing an average of about 7 oxyethylene units per molecule as deinking agent. Examples 3 and 4 were performed at pH values of 5.5 and 3.5, respectively, using the same deinking agent. The results of these examples indicate that equal or greater brightness was obtained when the flotation step was performed at acidic pH. The ink count value obtained in Example 3 is significantly less than that obtained in Comparative Example B. The ink count values of these examples may be compared because handsheets made from the deinked pulp had the same brightness value. Even though the handsheet made in Example 4 had a brightness which was 4 units greater than that obtained in Comparative Example B which would provide improved detection of faint ink particles, the ink count value was substantially less in Example 4.

Comparative Example C was performed at a conventional flotation deinking pH of 9.0. Examples 5, 6, and 7 utilized the same deinking agent, but the flotation was performed at pH values of 5.5, 3.5 and 7.0 respectively. Handsheet brightness values obtained at acidic or neutral pH in examples 5, 6, and 7 were at least equal to those obtained in Comparative Example C. The ink count values of the handsheets in Examples 5, 6 and 7 were significantly less than those of the handsheet in Comparative Example C.

The flotation deinking in Comparative Example D was performed at the conventional alkaline pH of 9.0 using a mixture of $C_{12}$ to $C_{15}$ predominantly linear and primary alcohols reacted sequentially with two moles (per mole of alcohol) of propylene oxide and seven moles (per mole of alcohol) ethylene oxide. Examples 8, 9, and 10 were performed at pH's of 7.0, 5.5, and 3.5 respectively. The results of these examples indicate that equal or greater brightness was obtained when the flotation step was performed at acidic pH. The ink count values observed in examples 8 and 10 were within experimental uncertainty of that of Comparative Example D. The substantially higher brightness of the handsheets of Examples 8 and 10 would favor detection of faint ink spots that could not be seen against the less bright, lower contrast background of Comparative Example D. The fact that Examples 8 and 10 do not exhibit higher ink count values than Comparative Example D. This suggests more effective ink removal in Examples 8 and 10.

Examples 11 and 12 demonstrate that adequate brightness levels can be obtained in pH 7 and pH 3.5 flotation deinking when the number of propylene oxide groups is increased to 3 and is relatively high compared to the number of ethylene oxide groups (PO:EO=0.5).

Examples 13 and 14 demonstrate that adequate brightness levels can be obtained in pH 7 and pH 3.5 flotation deinking when the number of ethylene oxide groups is increased to 17 and is relatively high compared to the number of propylene oxide groups (PO:EO=0.18).

Example 15 indicates that good deinking performance of $C_{12}$–$C_{15}(EO)_9$ is observed in neutral pH when 5% coconut fatty acid (a foam reducer) is part of the surfactant treatment.

Overall, these results indicate that flotation deinking performed at acidic pH, whether conducted as the only ink separation step or conducted as a second and final flotation step after an initial alkaline flotation step, is an effective method of separating ink from cellulose fibers. step, is an effective method of separating ink from cellulose fibers.

What is claimed is:

1. A process for the deinking of wastepaper stocks which comprises:
   a) converting the wastepaper to a pulp and contacting said pulp with an aqueous medium of alkaline pH containing a first surface active deinking agent,
   b) subjecting the resulting pulp-containing medium from step a) to a flotation step carried out at an alkaline pH,
   c) washing the pulp of step b) to remove additional ink, d) bleaching the pulp of step c) at an alkaline pH using hydrogen peroxide, e) contacting the pulp of step d) with a second surface active deinking agent selected from the group consisting of alcohol ethoxylate compounds, alcohol propoxyethoxylate compounds and mixtures thereof, and f) subjecting the pulp of step e) to one or more flotation steps wherein the final flotation step is carried out at a pH of less than about 7 to remove suspended ink therefrom and to condition said product for subsequent addition to a paper machine.

2. The process of claim 1 wherein said first surface active deinking agent is selected from the group consisting of alcohol ethoxylate compounds, alcohol propoxyethoxylate compounds and mixtures thereof.

3. The process of claim 2 wherein said first surface active deinking agent in step a) is an alcohol ethoxylate having a formula

$$R-O-(CH_2-CH_2O)_n-H \qquad (I)$$

wherein R is a straight-chain or branched-chain alkyl group having in the range of from about 8 to about 18 carbon atoms, or an alkylaryl group having an alkyl moiety having from about 8 to about 12 carbon atoms and n represents the average number of oxyethylene groups per molecule and is in the range of from about 6 to about 20.

4. The process of claim 3 wherein said alcohol ethoxylate compound has an average number of about 7 to about 15 oxyethylene groups per molecule.

5. The process of claim 3 wherein said first surface active deinking agent additionally comprises a $C_8$ to about $C_{18}$ fatty acid.

6. The process of claim 5 wherein said fatty acid is selected from the group consisting of lauric acid, stearic acid, tallow fatty acids, coconut fatty acid, hexadecanoic acid, tetradecanoic acid and mixtures thereof.

7. The process of claim 2 wherein said first surface active deinking agent in step a) is an alcohol propoxyethoxylate compound having a formula

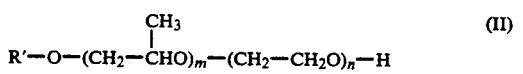

$$R'-O-(CH_2-\overset{CH_3}{\underset{|}{C}}HO)_m-(CH_2-CH_2O)_n-H \qquad (II)$$

wherein R' is a straight-chain or branched-chain alkyl group having in the range of from about 8 to about 18 carbon atoms, or an alkylaryl group having an alkyl moiety having from about 8 to about 12 carbon atoms, m m represents the average number of oxypropylene groups per molecule and is in the range of from about 0.5 to about 7, and n represents the average number of oxyethylene groups per molecule and is in the range of from about 1 to about 20.

8. The process of claim 7 wherein said alcohol propoxyethoxylate compound has an average number of about 1 to about 3 oxypropylene groups per molecule and an average number of about 2 to about 12 oxyethylene groups per molecule.

9. The process of claim 7 wherein said first surface active deinking agent additionally comprises a $C_8$ to about $C_{18}$ fatty acid.

10. The process of claim 9 wherein said fatty acid is selected from the group consisting of lauric acid, stearic acid, tallow fatty acids, coconut fatty acid, hexadecanoic acid, tetradecanoic acid and mixtures thereof.

11. The process of claim 1 wherein the aqueous medium of alkaline pH has a pH in the range of from about 8 to about 10.

12. The process of claim 1 wherein in step a) said first surface active deinking agent is added in a quantity between about 0.05 percent by weight to about 2.0 percent by weight.

13. The process of claim 12 wherein in step a) said first surface active deinking agent is added in a quantity between about 0.2 percent by weight to about 1.5 percent by weight.

14. The process of claim 1 wherein said final flotation step is carried out at a pH in the range of from about 3 to about 7.

15. The process of claim 14 wherein said final flotation step is carried out at a pH in the range of from about 3.5 to about 6.5.

16. The process of claim 15 wherein said final flotation step is carried out at a pH in the range of from about 5 to about 5.5.

17. The process of claim 1 wherein said second surface active deinking agent in step e) additionally comprises a $C_8$ to about $C_{18}$ fatty acid.

18. The process of claim 1 wherein the aqueous medium contains between about 0.5 percent by weight and about 12 percent by weight of pulp and step a) of the process is carried out at a temperature in the range of from about 30° C. to about 100° C.

* * * * *